United States Patent [19]
Pajari

[11] 3,754,488
[45] Aug. 28, 1973

[54] PIPE GROOVING APPARATUS
[75] Inventor: Yrjo Pajari, Willowdale, Ontario, Canada
[73] Assignee: Pajara Instruments, Willowdale, Ontario, Canada
[22] Filed: Mar. 27, 1972
[21] Appl. No.: 238,550

[52] U.S. Cl. .................................. 82/4 C
[51] Int. Cl. ............................... B23b 5/16
[58] Field of Search .................. 82/4 C, 4 R

[56] References Cited
UNITED STATES PATENTS
3,181,398  5/1965  Rogers ................... 82/4 C
1,811,894  6/1931  Parker .................... 82/4 C Primary Examiner—Leonidas Vlachos
Attorney—William D. Parks

[57] ABSTRACT

Apparatus is provided for facing the end of a pipe and for grooving the exterior surface of the pipe a fixed predetermined distance from the faced end. A drivable expandable chuck is provided to grip the inner surface of the pipe for rotation thereof and a tool holder micrometrically adjustable axially and transversely of the chuck is adapted to removably receive a facing tool and a grooving tool at a specific separation therebetween.

7 Claims, 6 Drawing Figures

PATENTED AUG 28 1973 3,754,488

PIPE GROOVING APPARATUS

This invention relates to machine tools in general and more particularly to a machine for gooving and end facing a pipe.

In the construction industry, considerable use is made of plastic and metallic pipes as conduits for water, sewage, air and as conduits for containing electrical cables. Recent practice has tended to stray away from permanent couplings between adjacent lengths of pipe or conduit towards a connection which not only completely seals the joint but is also easily removable in the event of problems within the pipe. In order to use such connections, it has been common practice to provide a groove in the outer surface of the pipes, very near to the ends to be joined. The connection is sealed in these grooves and clamped about the abutting pipes. It is therefore necessary to provide a groove in the pipe adjacent the end to be joined and it is also desirable to have that end of the pipe faced in order to ensure a proper joint.

The grooving operation is further complicated at the construction site as often the length of the pipes must be determined on the job and hence any equipment used to groove and face the pipes should be portable. This requirement of course obviates the use of a standard lathe which is usually anything but portable. A standard workshop lathe is also very limited in its ability to accommodate various lengths of pipe, the cost for a lathe which will accept extreme lengths of pipe being more than exorbitant.

The machine of the present application easily overcomes the existing difficulties of on-site, or for that matter, in-the-shop grooving of pipes. It provides an expandable chuck for internally gripping the pipe to be grooved, the chuck being operatively connected to a drive motor for rotation of the pipe. A tool holder adapted to receive an end facing tool, a grooving tool and a depth gauge or stop is movably attached to the frame which also holds the expandable chuck. The tool holder can be micrometrically adjusted to face the end of the pipe first by movement longitudinal of the pipe axis and to then groove the pipe to a preset depth by movement transverse to the pipe axis. The distance of the groove from the end of the pipe is always fixed by the separation of the end facing and grooving tools. Thus the apparatus of the present invention provides for fast, accurate grooving and facing of pipes, the apparatus being easily transportable for use on the construction site. A freely portable stand may be used to support the free end of the pipe being grooved.

The apparatus of the present invention will now be described in more detail and with reference to the drawings wherein.

Figure 3:
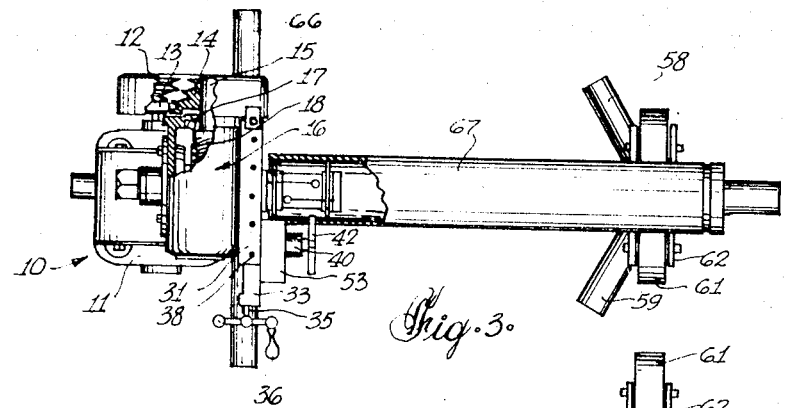
FIG. 3 is a partial plan view of the apparatus of FIG. 1, with portions thereof being shown in cross-section for sake of clarity, a pipe being shown in place in the apparatus.
Figure 1:
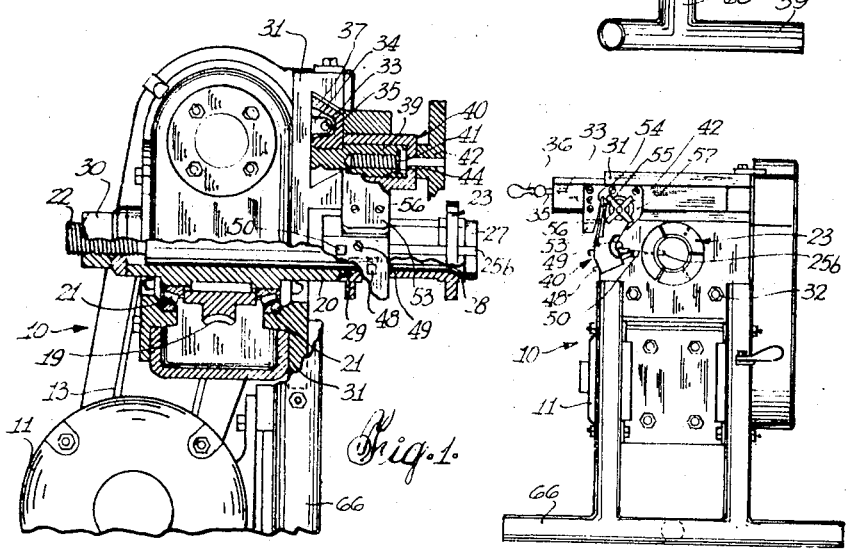
FIG. 1 is a partial side view of apparatus incorporating the present invention with portions thereof shown in cross-section for sake of clarity.
Figure 2:
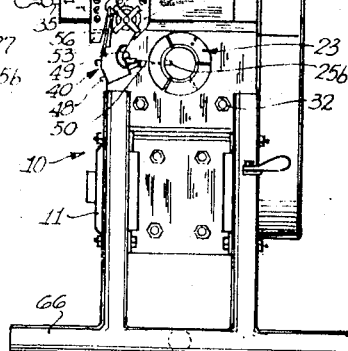
FIG. 2 is an end view of the apparatus of FIG. 1.

FIGS. 1, 2 and 3 illustrate a pipe-grooving machine 10 incorporating the features of the present invention. While FIGS. 2 and 3 show the machine as set up, in plan and end views, FIG. 1 shows an enlarged partial side view thereof. For ease of understanding, the machine supports of FIGS. 2 and 3 are omitted from FIG. 1.

The machine of FIGS. 1, 2 and 3 is driven by an electric motor 11 which drives three-step V-pully 12, connected by V-belt 13 to a second V-pulley 14. Pulley 14 is in turn connected to shaft 15 of speed reducer 16, the shaft being rotatable on two roller bearings 17 (one shown). Shaft 15 also supports a worm gear 18 which drives gear 19, keyed to main shaft 20 which is rotatable in roller bearings 21. Appropriate covers enclose the speed reducer 16 and the gear housing containing gear 19 and bearings 21.

Figures 5, 6:
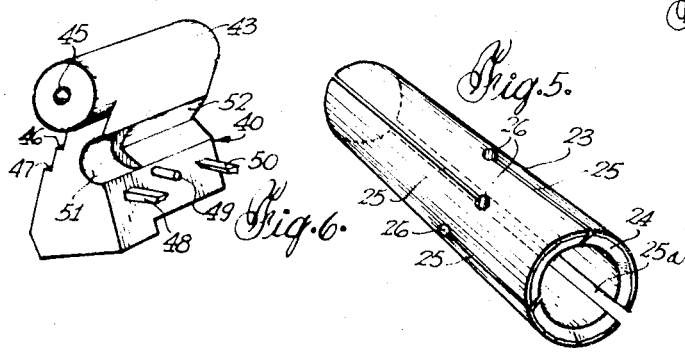
FIG. 5 is a perspective view of the expandable chuck used in the apparatus of FIG. 1.
FIG. 6 is a perspective view of the tool holder used in the apparatus of FIG. 1.

Main shaft 20 is hollow (FIG. 1) and contains a slidable shaft 22, the rearmost end of which is threaded, the other end being adapted to receive expandable chuck 23. This chuck is shown in greater detail in FIG. 5 wherein it is seen that it is of a generally cylindrical shape with an inner diameter sufficient for a sliding fit on shaft 22. Slot 25a extends along the length of chuck 23 and permits the use of key 25b for fixing the chuck on shaft 22. Each end of chuck 23 has an inwardly directed bevel portion 24 and preferably three longitudinal slits 25 each leading from its end to a hole 26 approximately two thirds of the distance along the chuck. The slits at each end are circumferentially spaced and offset by equal amounts from the slits at the other end. Should a chuck be desired to accommodate pipes of large diameter, outwardly directed flanges of a diameter slightly less than that of the pipe could be provided adjacent each end, the slits 25 traversing the flanges and also extending partially along the body portion between the flanges.

A wedge block 27 (FIG. 1) is fixedly attached to slidable shaft 22 adjacent the outer end of chuck 23, the block having a bevelled portion 28 for co-operation with its associated bevelled portion 24 on chuck 23. The bevel portion at the other end of chuck 23 co-operates with the bevelled end 29 of main shaft 20. Thus when threaded nut 30 abutting the back end of main shaft 20 is turned, slidable shaft 22 is moved axially of main shaft 20. Movement towards the left as shown in FIG. 1 will cause bevelled portion 28 of wedge block 27 to engage bevelled portion 24 of the chuck, moving the other end of the chuck into engagement with the bevelled portion 29 of main shaft 20. Continued leftward movement causes the two ends of the chuck to expand to eventually grip the inner surface of a pipe initially slid thereover. Thus a quick-connect and accurate means is provided for holding a pipe during a grooving operation there being nothing externally of the pipe to interfere with the said grooving operation.

The machine of the present invention utilizes a main frame 31 to which speed reducer 16 is bolted, as at 32. A lead screw controlled sliding table 33 is also attached to the main frame, the sliding table being movable through co-operation of lead screw nut 34 and lead screw 35. A handle 36 is provided for turning the lead screw to thereby advance or withdraw the sliding table 33 from the vicinity of expandable chuck 23. While not shown, it would be obvious to a skilled practitioner in the art to provide lead screw 35 with micrometer scales for extremely accurate machining.

A simple method of altering the resistance to movement offered by the sliding table is herein described. As shown in FIG. 1, sliding table 33 has an upper surface which is parallel to the undercut surface of main frame 31. There is a separation between these two surfaces which is occupied by a metal strip 37. Screws 38 in main frame 31 apply downward pressure on metal strip 37 to increase or decrease the frictional resistance between the strip and the table, to increase or decrease the latter's resistance to movement.

Threaded post 39 is fixedly attached to sliding table 33 as by rivetting, the post being adapted to slidably receive thereover a tool holder 40. Tool holder 40 has associated with it a lead screw 41 controlled by handle 42 which serves to provide movement of the tool holder longitudinally of the machine relative to post 39. Tool holder 40 is more completely shown in FIG. 6 and will be described as follows in greater detail.

Tool holder 40 provides in one unit the preset components which enable the rapid and accurate pipe grooving obtainable with the present invention. The tool holder is preferably cast and then machined to a configuration similar to that shown in FIG. 6. The uppermost portion 43 is essentially cylindrical in shape and has an axial bore 44 (FIG. 1) which permits the tool holder to be slid over post 39. An axial bore 45 in the opposite end of portion 43 permits the lead screw 41 to be attached to handle 42 external of the tool holder. The back face of tool holder 40 has two steps 46 and 47 running the full length thereof, the purpose of which will be described hereinafter. Lastly, appropriately shaped bores are provided in the base of the tool holder to accept grooving tool 48, stop 49 and end facing tool 50. The longitudinal separation between tools 48 and 50 is preset and thus determines the location of the groove relative to the end of the pipe. Different separations could be accommodated by using other tool holders, each having an appropriate separation. Cut-back portions 51 and 52 permit close-in manipulation of the tool holder near the pipe and also catch chips of material removed from the pipe.

Tool holder support 53 is fixedly attached to sliding table 33 and surrounds the upper portion of tool holder 40. It is provided with a groove 54 therein adjacent and parallel to portion 43 of the tool holder. Groove 54 is adapted to receive a spring plate 55 which extends downwardly for reception in step 47 in tool holder 40. Two screws 56 in the back face of support 53 apply pressure against plate 55 in the vicinity of step 46 thereby biassing the entire tool holder towards stop protion 57 on the front face of support 53.

Figure 4:
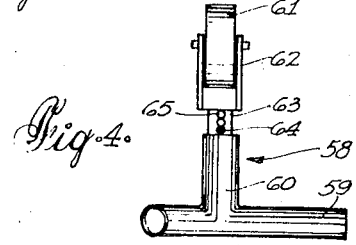
FIG. 4 is a side view of a pipe support used in conjunction with the apparatus of FIG. 1.

In order to accommodate pipes of great length, a stand 58 (FIGS. 3 and 4) is provided for receiving the free end of a pipe to be grooved. The stand includes a flor engaging portion 59, one section 60 of which is upright. Two rollers 61 are mounted side by side in brackets 62 which are in turn attached to shaft 63 receivable in upright 60 and adjustable therein for height by placement of a pin 64 in one of many sets of holes 65 in shaft 63. Thus pipes of different diameters may easily be supported. The main machine 10 is also secured to a stand 66 and is thus easily transportable and relocatable. Operation of the pipe grooving machine of the present invention will now be described with particular reference to FIG. 3. One end of a pipe 67 to be grooved is slid over an appropriately sized chuck 23, the other end resting on rollers 61 of stand 58. Nut 30 on sliding shaft 22 is tightened to expand the chuck in a manner as previously described until the pipe is securely held thereby. Handle 36 on lead screw 35 is rotated in order to advance table 33 and tool holder 40 towards pipe 67. With this initial advance, tool holder 40 is positioned longitudinally of the pipe so that there is no cutting by tools 48 or 50. Handle 42 is then rotated to advance end facing tool to towards the end of the pipe, the tool then engaging the pipe to cleanly face it. Having faced the end of the pipe, lead screw 35 is again rotated to advance the tool holder towards the pipe so that grooving tool 48 engages the outer surface and commences to form a groove therein. The depth of the groove is determined by the preset position of stop 49 which prevents the tool 48 from cutting any deeper once it has contacted the outer surface of the pipe. The axial position of the groove is of course determined by the separation of tools 48 and 50.

Once one end has been satisfactorily faced and grooved, the chuck 23 can be returned to its normal configuration and the pipe reversed end for end for facing and grooving of the other end.

It should be noted that spring plate 55 biases the tool holder against support stop 57. This feature ensures a steady pressure of tool 48 against the pipe surface and eliminates any chattering of the tool which might result from an uneven pipe surface or a slightly worn tool. Tools 48 and 50 may of course be easily removed from tool holder 40 in any well known manner for quick replacement.

The embodiments of the invention in which an exclusive property or privilege is claimed are defined as follows:

1. Portable pipe facing and grooving apparatus comprising a support frame, power means attached to said frame and operatively connected to chuck means, said chuck means being substantially cylindrical and expandable in diameter at each end thereof to grip a pipe on its inner surface adjacent an end to be faced and grooved to effect rotation thereof, and facing and grooving means movable axially and transversely with respect to said chuck means, said facing and grooving means comprising a tool holder connected to and movable with respect to said frame, said tool holder being adapted to removably receive a facing tool for facing the end of a pipe held by said chuck means and a grooving tool a predetermined fixed distance from said facing tool for grooving the outer surface of said pipe at said predetermined distance from the faced end thereof.

2. Apparatus according to claim 1 wherein said chuck means comprises a hollow cylinder each end thereof having an inwardly directed annular bevelled portion and a plurality of circumferentially spaced, longitudinally directed slits, each said slit terminating in a radially directed hole a short distance from the opposite end of said chuck means, the slits associated with one end being circumferentially offset from the slits of the opposite end.

3. Apparatus according to claim 2 and including a main hollow shaft connected to said power means, a secondary shaft within said main shaft, means for moving said secondary shaft axially with respect to said main shaft, said chuck means being slidably attached to said secondary shaft, and expanding means associated with said secondary and main shafts and with said chuck means for expanding the diameter of said chuck means at each end thereof.

4. Apparatus according to claim 3 wherein said expanding means includes a wedge block fixedly attached to said secondary shaft at one end thereof adjacent said chuck means, said wedge block having a bevelled portion co-operative with the adjacent bevelled portion of said chuck means, and a bevelled end of said main shaft adjacent the opposite bevelled portion of said chuck means whereby movement of said wedge block towards said chuck means will effect engagement of the bevelled portions of said wedge block and main shaft with the associated bevelled portion of said chuck means thereby expanding each end of said chuck means outwardly.

5. Apparatus according to claim 4 wherein said tool holder is connected to a slide table micrometrically movable by means of a lead screw transversely of the axis of said chuck means, the connection of said tool holder to said slide table including a lead screw operative between the slide table and the tool holder for micrometric adjustment thereof longitudinal of the axis of said chuck means.

6. Apparatus according to claim 5 and including spring means adjustably connected between said tool holder and support means on said table, said spring means biassing said tool holder towards said chuck means.

7. Apparatus according to claim 6 wherein said tool holder is adapted to receive an adjustable stop means, said stop means being cooperable with said grooving tool to groove said pipe to a predetermined depth.

* * * * *